June 1, 1926.

H. B. THURSTON 1,587,255

COMPOSITE METAL PLUG

Filed Sept. 17, 1923

INVENTOR

Herman B. Thurston,
BY Baker & Macklin,
ATTYS.

Patented June 1, 1926.

1,587,255

UNITED STATES PATENT OFFICE.

HERMAN B. THURSTON, OF CLEVELAND HEIGHTS, OHIO, ASSIGNOR TO THE TALMAGE MANUFACTURING COMPANY, OF CLEVELAND, OHIO, A CORPORATION OF OHIO.

COMPOSITE-METAL PLUG.

Application filed September 17, 1923. Serial No. 663,273.

This invention relates to removable threaded plugs for use in fireboxes, boilers and other places. In such use, a plug entirely of iron or steel is unsatisfactory, as the rusting or corroding interferes greatly with the removability. On the other hand, a plug entirely of brass, while avoiding the disadvantage of the threads becoming bound to the steel shell, has the disadvantage that the comparatively soft head of the plug becomes quickly worn from its angular shape by successive applications of the wrench or for other causes. For instance, where the plug extends into the firebox, as where it is used to close the inner end of a low water alarm, the effect of the flames and the cinder abrasion on the plug head rapidly destroys such head, if made of brass.

My invention is designed to provide a plug which will have all the advantages of both steel or iron plugs and brass plugs, without the disadvantages of either. To this end, I provide a composite plug having a threaded portion of brass or similar material and a head of iron (which term includes steel, malleable iron, etc.), the head having a cavity in it occupied by an extension of the brass member. The cavity in the body of the head is undercut or enlarged and preferably of angular contour, whereby if the brass portion is cast into place it will be effectively interlocked with the head. The head preferably has extensions projecting into the brass portion to more effectively resist torsional strain.

Preferably, the iron head has one or two threads turned on it, which will be a continuation of the threads on the brass member. The threads may be tapered and so dimensioned with reference to the opening they occupy, that the iron threads will just enter the opening. In such installation, the iron head and threads entirely protect the brass member while at the same time the iron threads extend such a short distance into the shell that they do not become effectively bound thereto.

My invention is hereinafter more fully described in connection with the drawings and the essential characteristics are summarized in the claims.

Figure 1:
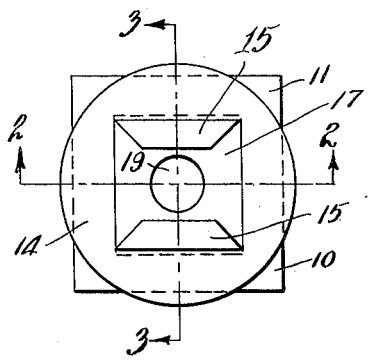
Figure 2:
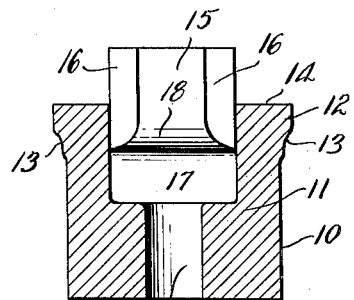
Figure 3:
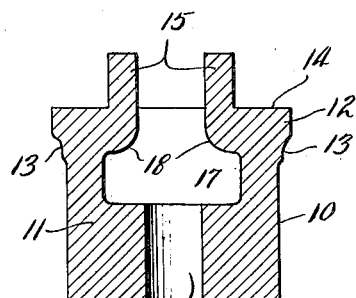
Figure 4:
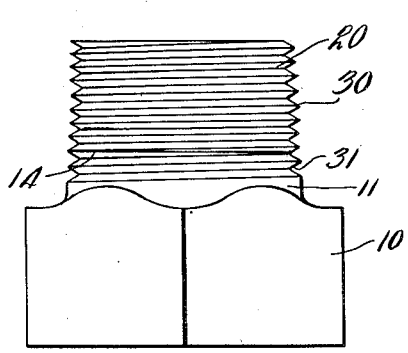
Figure 5:
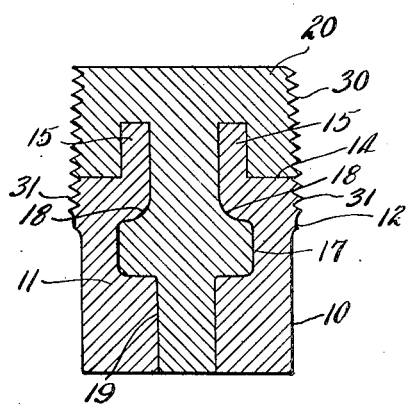

In the drawings, Fig. 1 is a bottom plan of the iron head before the brass member is mounted thereon; Figs. 2 and 3 are transverse sections thereof as indicated by the lines 2—2 and 3—3 on Fig. 1; Fig. 4 is a side elevation of the complete plug; Fig. 5 is a diametric section of the complete plug in a plane parallel with Fig. 3.

In the drawings, 10 indicates the iron head and 20, the brass threaded member. The head may conveniently be a malleable casting and as shown, comprises a body portion 11, the exterior of which is angular, as for instance square. The blank or original casting for the head shown in Figs. 1, 2 and 3, has a cylindrical portion of short extent 12, connected with the angular portion by easy curves 13. The cylindrical portion has a flat annular seat 14 and projecting from this seat are two tongues 15, each of which is laterally elongated and has its edges preferably beveled as shown at 16. In the interior of the plug is a cavity 17, angular in contour, preferably square, and having its sides of a width about equal to that of the tongue 15. Each tongue has its under edge rounded, as at 18, to the wall about the cavity, the cavity thus extending laterally beneath the tongues. Extending from the cavity to the head end of the plug, is an opening 19, which may be cylindrical. The blank for the head described may be readily cast in the form described, and malleablized.

The brass plug portion 20 is cast in place and lies about the tongues 15 and between them and in the cavity 17 and the opening 19 I find it desirable first to cast and malleablize the head, and then position it in a cavitary mold for the brass member and then pour the liquid brass through the opening 19, which thus fills the cavities within the plug and fills the space in the mold for the threaded portion of the head. It is preferable to place the heads in the bottom of the mold with the tongues extending upwardly, and to pour the brass by means of lateral gate openings into the bottom of the bores 19. Proper venting and risers at the top of the mold permit the escape of the gases. The curvatures 18 at the base of the tongues prevent any pocketing of the gases beneath them and the brass lies close to the iron throughout their common area.

After the combined member has been cast as described, a suitable thread 30 is turned on the brass member and continued for a short distance as shown at 31, onto the head member, the iron threads thus cutting away a portion of the cylindrical flange 12 of the blank. The threading may be slightly tapered if desired, so that when the plug is screwed into place, its threads will form a tight joint with the shell, and, as stated, the opening in the shell is preferably of such size with reference to the plug that the plug comes to a stop with the iron threads 31 just entering or projecting a very short distance into the shell.

Such a plug as above described may be cheaply made, and as will be seen, the brass threaded portion is effectively bound to the iron head portion so that a wrench applied to the head portion may turn the plug into or out of place without danger of stripping it from the brass portion even though the latter meets much resistance. My plug may be installed with the same rough handling as an all-steel plug and it will as effectively withstand the fire-box temperature and the abrading action of the fire-box cinders. On the other hand, it does not adhere to the steel shell as would an all-steel plug, and may therefore be removed without injury whenever desired.

I claim:—

1. In a composite metal plug, the combination of a head having an internal cavity, a tongue projecting longitudinally of the head at the side of the cavity, and a threaded member having a central portion extending into the cavity in the head, said threaded member embracing the tongue of the head.

2. In a composite metal plug, the combination of a head having an internal cavity, a pair of projecting tongues on opposite sides of the cavity, and a threaded member having a central portion extending into the cavity in the head, said threaded member embracing the tongues of the head.

3. In a composite metal plug, an iron head having an angular exterior and having a longitudinal opening through it from one end to the other, said opening being internally enlarged, and a brass threaded member bearing against the end of the iron member and having a central portion extending substantially through the iron head and thereby occupying the enlarged cavity.

4. A composite metal plug comprising a tough metal head having an angular exterior, an internal cavity, and projecting tongues on opposite sides of the cavity, and a soft metal member cast about said tongues and bearing against the end of the tough metal member and having a central extension passing between the tongues and occupying the cavity, and there being a continuous thread on the exterior of the soft metal portion and passing for a short distance onto the tough metal portion.

In testimony whereof, I hereunto affix my signature.

HERMAN B. THURSTON.